US012645118B2

(12) United States Patent     (10) Patent No.:   US 12,645,118 B2

Hu       (45) Date of Patent:     Jun. 2, 2026

(54) DISPLAY PANEL HAVING CLOCK SIGNAL WIRES PARTIALLY OVERLAPPING WITH GATE DRIVERS ON ARRAY AND RELATED DISPLAY DEVICE

(71) Applicants: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

(72) Inventor: Meng Hu, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 552 days.

(21) Appl. No.: 17/753,073

(22) PCT Filed: Jan. 29, 2022

(86) PCT No.: PCT/CN2022/074867

§ 371 (c)(1),
(2) Date: Feb. 17, 2022

(87) PCT Pub. No.: WO2023/137797

PCT Pub. Date: Jul. 27, 2023

(65) Prior Publication Data

US 2024/0036405 A1     Feb. 1, 2024

(30) Foreign Application Priority Data

Jan. 20, 2022    (CN) ........................ 202210063725.X

(51) Int. Cl.
*G02F 1/1345*    (2006.01)
*G02F 1/1333*    (2006.01)
*G02F 1/1362*    (2006.01)

(52) U.S. Cl.
CPC .... *G02F 1/13454* (2013.01); *G02F 1/133345* (2013.01); *G02F 1/136286* (2013.01); *G02F 1/136227* (2013.01)

(58) Field of Classification Search
CPC ........... G02F 1/13454; G02F 1/133345; G02F 1/136286; G02F 1/136227; G09G 3/3677
See application file for complete search history.

(56) References Cited

U.S. PATENT DOCUMENTS

2008/0129717 A1   6/2008   Lee et al.
2017/0307944 A1   10/2017   Xing et al.
(Continued)

FOREIGN PATENT DOCUMENTS

CN    104617106 A    5/2015
CN    208156354 U    11/2018
(Continued)

OTHER PUBLICATIONS

Lyu et al., Machine Translation of Foreign Patent Document CN 111223439 A, GOA circuit applied to array substrate, array substrate and manufacturing method of GOA circuit, Jun. 2, 2020, pp. 1-14 (Year: 2020).*

(Continued)

*Primary Examiner* — Amr A Awad
*Assistant Examiner* — Maheen I Javed

(57)       ABSTRACT

A display panel and a display device are provided. The display panel includes a substrate, clock signal wires disposed on the substrate, and a GOA circuit. The GOA circuit includes cascaded GOA units. The GOA circuit and the clock signal wire are arranged on different layers. The GOA (Continued)

units are correspondingly connected to the clock signal wires via holes. A positive projection of the plurality of clock signal wires on the substrate overlaps a positive projection of the GOA circuit on the substrate.

9 Claims, 4 Drawing Sheets

(56)    References Cited

U.S. PATENT DOCUMENTS

| | | | |
|---|---|---|---|
| 2020/0119127 A1 | 4/2020 | Tian et al. | |
| 2020/0176480 A1* | 6/2020 | Chen | H01L 27/124 |
| 2021/0327383 A1* | 10/2021 | He | G09G 3/3677 |

FOREIGN PATENT DOCUMENTS

| | | |
|---|---|---|
| CN | 109119039 A | 1/2019 |
| CN | 111090202 A | 5/2020 |
| CN | 111223439 A * | 6/2020 |
| CN | 211238253 U | 8/2020 |
| CN | 112433415 A | 3/2021 |
| CN | 213877370 U | 8/2021 |
| CN | 113781913 A * | 12/2021 ............... G09G 3/22 |
| KR | 20050000193 A | 1/2005 |
| KR | 20190004873 A | 1/2019 |
| KR | 20210085068 A | 7/2021 |
| WO | 2018223470 A1 | 12/2018 |

OTHER PUBLICATIONS

Li et al., Machine Translation of Foreign Patent Document CN 113781913 A, Display panel and display device, Dec. 20, 2021, pp. 1-46 (Year: 2021).*

* cited by examiner

DISPLAY PANEL HAVING CLOCK SIGNAL WIRES PARTIALLY OVERLAPPING WITH GATE DRIVERS ON ARRAY AND RELATED DISPLAY DEVICE

FIELD OF THE DISCLOSURE

The present disclosure relates to display technology, and more particularly, to a display panel and a display device.

BACKGROUND

A gate driver on array (GOA) techniques proposes an array substrate that integrates a gate driver circuit on a display panel to implement row-by-row scanning so as to save the gate driver circuit area. It has the advantages of lowering production costs and facilitates the design of a narrow bezel of the display panel so the GOA is applied for a variety of displays.

The GOA circuit outputs a scanning signal based on a controlling signal. The controlling signal includes a multi-channel clock signal transmitted through a plurality of clock signal wires. The plurality of clock signal wires are sequentially arranged in the same direction, and each of the GOA units is connected to its corresponding clock signal wire through the connecting wire. The plurality of clock signal wires and the GOA circuit are disposed on the same plane, and some space is spared between among the adjacent clock signal wires in the manufacturing process of the panel in the related art. Therefore, the pitch between the plurality of GOA units and their corresponding clock signal wires is greater. As a result, the resistance loss is generated by the connecting wire or the resistance loss generated by the connecting wire is different from the parasitic resistance among other conductive layers, thereby affecting the uniformity of the clock signal transmitted to each of the GOA units.

SUMMARY

An object of the present disclosure is to propose a display panel and a display device to deal with a problem in the related art that pitch between a plurality of gate driver on array (GOA) units and their corresponding clock signal wires differs a lot, which may affect the uniformity of the corresponding clock signals transmitted to the plurality of GOA units.

According to a first aspect of the present disclosure, a display panel includes a substrate, a plurality of clock signal wires disposed on the substrate and arranged in a first direction, and a gate driver on array (GOA) circuit. The GOA circuit includes a plurality of cascaded GOA units arranged in a second direction perpendicular to the first direction. The GOA circuit and the clock signal wire are arranged on different layers. The GOA units are correspondingly connected to the clock signal wires via holes. A positive projection of the plurality of clock signal wires on the substrate overlaps a positive projection of the GOA circuit on the substrate.

Optionally, each of the clock signal wires intersects the plurality of GOA units. The clock signal wire is arranged on different layers; a vertical distance between each of the GOA units and its corresponding clock signal wire is equal.

Optionally, the display panel further includes an insulating layer disposed between the clock signal wire and the GOA circuit. The holes are disposed in the insulating layer. An aperture of each of the holes is the same, and an angle formed by an extension direction of the holes and a thickness direction of the insulating layer is equal.

Optionally, the extension direction of the holes is perpendicular to a plane direction of the insulating layer.

Optionally, the plurality of the clock signal wires comprise a first clock signal wire and a second clock signal wire; the first clock signal wire intersects the plurality of GOA units on different layers. A positive projection of the second clock signal wire on the substrate is interlaced with the positive projection of the GOA unit on the substrate.

Optionally, the display panel further includes an insulating layer disposed between the clock signal wire and the GOA circuit. The holes are disposed in the insulating layer. An angle formed by an extension direction of the holes corresponding to the first clock signal wire and a thickness direction of the insulating layer is greater than zero degree.

Optionally, an aperture of the hole which the second clock signal corresponds to is greater than an aperture of the hole which the first clock signal corresponds to.

Optionally, each of the holes which the second clock signal wire corresponds to comprises a plurality of sub-holes. The second clock signal wire is connected to the corresponding GOA unit through the plurality of sub-holes.

Optionally, an aperture of each of the holes which the first clock signal wire corresponds to is the same as an aperture of the sub-hole.

Optionally, the display panel further includes an insulating layer disposed between the clock signal wire and the GOA circuit. The holes are disposed in the insulating layer. An extension direction of the holes which the first clock signal wire corresponds to is parallel to a thickness direction of the insulating layer, and an aperture of the hole which the second clock signal wire corresponds to is greater than an aperture of the hole which the first clock signal wire corresponds to.

According to a second aspect of the present disclosure, a display device includes a display panel and a timing controller. The display panel includes a substrate, a plurality of clock signal wires disposed on the substrate and arranged in a first direction, and a gate driver on array (GOA) circuit. The GOA circuit includes a plurality of cascaded GOA units arranged in a second direction perpendicular to the first direction. The GOA circuit and the clock signal wire are arranged on different layers. The GOA units are correspondingly connected to the clock signal wires via holes. A positive projection of the plurality of clock signal wires on the substrate overlaps a positive projection of the GOA circuit on the substrate.

Optionally, each of the clock signal wires intersects the plurality of GOA units. The clock signal wire is arranged on different layers; a vertical distance between each of the GOA units and its corresponding clock signal wire is equal.

Optionally, the display panel further includes an insulating layer disposed between the clock signal wire and the GOA circuit. The holes are disposed in the insulating layer. An aperture of each of the holes is the same, and an angle formed by an extension direction of the holes and a thickness direction of the insulating layer is equal.

Optionally, the extension direction of the holes is perpendicular to a plane direction of the insulating layer.

Optionally, the plurality of the clock signal wires comprise a first clock signal wire and a second clock signal wire; the first clock signal wire intersects the plurality of GOA units on different layers. A positive projection of the second clock signal wire on the substrate is interlaced with the positive projection of the GOA unit on the substrate.

Optionally, the display panel further includes an insulating layer disposed between the clock signal wire and the GOA circuit. The holes are disposed in the insulating layer. An angle formed by an extension direction of the holes corresponding to the first clock signal wire and a thickness direction of the insulating layer is greater than zero degree.

Optionally, an aperture of the hole which the second clock signal corresponds to is greater than an aperture of the hole which the first clock signal corresponds to.

Optionally, each of the holes which the second clock signal wire corresponds to comprises a plurality of sub-holes. The second clock signal wire is connected to the corresponding GOA unit through the plurality of sub-holes.

Optionally, an aperture of each of the holes which the first clock signal wire corresponds to is the same as an aperture of the sub-hole.

Optionally, the display panel further includes an insulating layer disposed between the clock signal wire and the GOA circuit. The holes are disposed in the insulating layer. An extension direction of the holes which the first clock signal wire corresponds to is parallel to a thickness direction of the insulating layer, and an aperture of the hole which the second clock signal wire corresponds to is greater than an aperture of the hole which the first clock signal wire corresponds to.

The present disclosure proposes a display panel and a display device. The GOA circuit and the clock signal wire are disposed on different layers. Each of the GOA units is connected to its corresponding clock signal wire via a hole in the present disclosure. The positive projection of the plurality of clock signal wires on the substrate overlaps the positive projection of the GOA circuit on the substrate partially. It may effectively reduce the pitch difference between the plurality of GOA units and their corresponding clock signal wires, thereby increasing the uniformity of the clock signal transmitted to each GOA unit since the GOA circuit and the clock signal wire are disposed on different layers and the positive projection of the plurality of clock signal wires on the substrate overlaps one or more of the positive projection of the GOA circuit on the substrate partially in the present disclosure. In addition, the bezel of the display panel can be further reduced because the positive projection of the plurality of clock signal wires on the substrate overlaps one or more of the positive projection of the GOA circuit on the substrate partially. In this way, the bezel of the display panel is narrowed successfully.

DETAILED DESCRIPTION OF THE EMBODIMENTS

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

It is understood that the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

Figure 1:
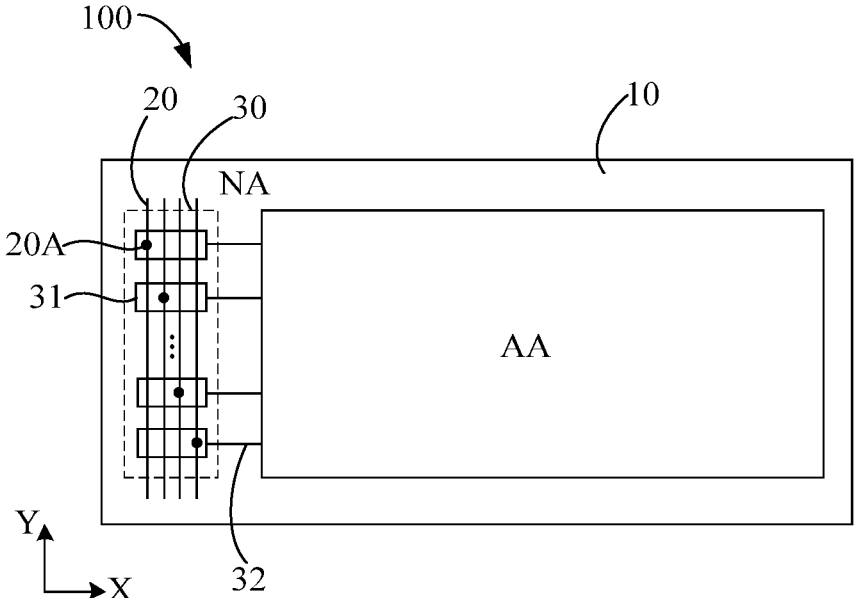
FIG. 1 is a schematic diagram of a first planar structure of a display panel according to the present disclosure.
Figure 2:
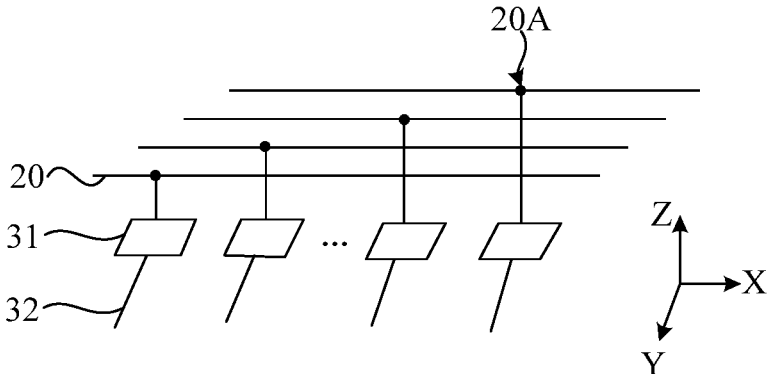
FIG. 2 is a schematic diagram of a partial structure of the display panel according to the present disclosure.

Please refer to FIG. 1 and FIG. 2. FIG. 1 is a schematic diagram of a first planar structure of a display panel 100 according to the present disclosure. FIG. 2 is a schematic diagram of a partial structure of the display panel 100 according to the present disclosure. The display panel 100 includes a substrate 10, a plurality of clock signal wires 20, and a gate driver on array (GOA) circuit 30.

The plurality of clock signal wires 20 are disposed on the substrate 10. The plurality of clock signal wires 20 are arranged in a first direction X. The plurality of clock signal wires 20 extend in a second direction Y. The GOA circuit 30 is disposed on the substrate 10. The GOA circuit 30 includes a plurality of cascaded GOA units 31. The plurality of cascaded GOA units 31 are arranged in the second direction Y. The second direction Y intersects the first direction X. The GOA circuit 30 and the clock signal wire 20 are arranged on different layers. Each of the GOA units 31 is connected to its corresponding clock signal wire 20 via the hole 20A. A positive projection of the plurality of clock signal wires 20 on the substrate 10 overlaps one or more of a positive projection of the GOA circuit 30 on the substrate 10.

The second direction Y and the first direction X may vertically intersect. The second direction Y may be vertical to the first direction X without crossing. Specifically, the display panel 100 is designed according to the driving structure of the display panel 100. The figures are for better understanding instead of limiting the present disclosure.

Because the GOA circuit 30 is disposed in different layers with the clock signal wire 20 and the positive projection of the plurality of clock signal wires 20 on the substrate 10 overlaps one or more of a positive projection of the GOA circuit 30 on the substrate 10, the vertical distance between the GOA unit 31 with the overlapping part and the clock signal wire is substantially equal. Therefore, the pitch difference between the plurality of GOA units 31 and its corresponding clock signal wire 20 can be effectively reduced, and the transmission loss difference, parasitic capacitance difference, and so on are lessened due to the pitch difference. In other words, the uniformity of the clock signal transmitted to each of the GOA units 31 is improved, and the uniformity of a scanning signal output by each of the GOA units 31 is improved as well. Because the positive projection of the plurality of clock signal wires 20 on the substrate 10 overlaps one or more of the positive projection of the GOA circuit 30 on the substrate 10, the bezel of the display panel 100 is narrowed. So the goal of narrowing the bezel is achieved.

The hole 20A is configured for connection in the embodiment of the present disclosure, which means that a conductive material is disposed in the hole 20A; in other words, a connecting wire is configured for connection. That is, the GOA unit 31 is connected to the corresponding clock signal wire 20 through the hole 20A, which means that, and the GOA unit 31 is connected to the corresponding clock signal wire 20 through the connecting wire in the hole 20A. The extension length of the hole 20A indicates the length of the connecting wire, that is, the pitch between the GOA unit 31 and its corresponding clock signal wire 20. The aperture of the hole 20A indicates the cross-sectional dimension of the connecting wire.

The substrate 10 can be a glass substrate, a quartz substrate, a resin substrate, a flexible substrate, or other types of substrates. No further detail is provided here. Further, the substrate may be a single-layer substrate or a multilayer substrate disposed of a laminated layer. The material of the clock signal wire 20 may be copper, aluminum, nickel, an ally of copper, aluminum, and nickel, or a mixture of metal materials.

Take the GOA circuit 30 with a 4CK signal for example in the embodiment of the present disclosure. However, the principle of the present disclosure is equally applicable to the GOA circuit 30 with a 2CK signal, a 4CK signal, a 6CK signal, a 12CK signal, and a plural CK signal. Therefore, the introduction of the embodiment of the present disclosure should not be understood as a limitation to the present disclosure.

The display panel 100 includes a display area AA and a non-display area NA surrounding the display area AA. Both of the clock signal wire 20 and the GOA circuit 30 are arranged in the non-display area NA. A plurality of scanning wires disposed in the second direction Y (not shown) are arranged in the display area AA. Each of the GOA units 31 is electrically connected to one or more of the scanning wires through the signal transmission wire 32 to transmit the scanning signal to the display area AA.

In the embodiment of the present disclosure, the GOA circuit 30 may adopt the driving method of a double-side driving mode when being disposed at both sides of the display area AA and may merely adopt the driving method of a single-side driving mode when being disposed at a single side of the display area AA. The single-side-driving configuration facilitates the arrangement of the narrow bezel. Compared with the single-side-driving configuration, the two-side-driving configuration can reduce the propagation delay of each of the scanning signals in the present disclosure. The arrangement of the GOA circuit 30 can be designed according to the actual needs, in other words, no specific arrangements for the GOA circuit 30 are preferred in the present disclosure. The figures of the present disclosure are merely illustrative, which is not understood to be limited to the present disclosure.

Figure 3:
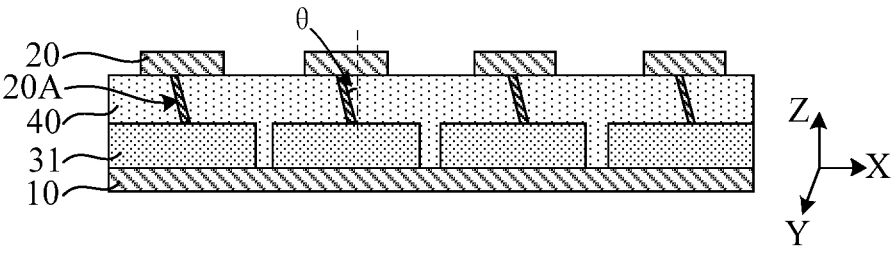
FIG. 3 is a schematic diagram of a first cross-sectional structure of the display panel as illustrated in FIG. 1.

Please refer to FIG. 1 and FIG. 3. FIG. 3 is a schematic diagram of a first cross-sectional structure of the display panel 100 as illustrated in FIG. 1. Each of the clock signal wires 20 intersects the plurality of GOA units 31, and the clock signal wires 20 are arranged on different layers. The vertical distance between each of the plurality of GOA units 31 and its corresponding clock signal wire 20 is equal.

Each of the clock signal wires 20 intersects the plurality of GOA units 31, and the clock signal wires 20 and the plurality of GOA units 31 are disposed on different layers. Therefore, the positive projection of the area where the clock signal wire 20 intersects the GOA circuit 30 on the substrate 10 is located in the positive projection of the GOA unit 31 on the substrate 10. Further, the width of the bezel of the display panel 100 is reduced. In addition, each of the clock signal wires 20 intersects the plurality of GOA units 31, and the clock signal wires 20 and the plurality of GOA units 31 are disposed on different layers. The vertical distance between each of the GOA units 31 and its corresponding clock signal wire 20 is essentially equal on the basis of possible errors in the process. Accordingly, the pitch between the plurality of GOA units 31 and their corresponding clock signal wires 20 may be equal. Further, the uniformity of the clock signal transmitted to each of the GOA units 31 may be improved.

Further, the display panel 100 includes an insulating layer 40. The insulating layer 40 is disposed between the clock signal wire 20 and the GOA circuit 30. A hole 20A is disposed in the insulating layer 40. The aperture of each of the holes 20A is equal. An angle θ formed by an extension direction of each of the holes 20A and a direction Z perpendicular to the insulating layer 40 is equal.

The direction Z perpendicular to the insulating layer 40 is perpendicular to the first direction X and the second direction Y. The angle θ is an arbitrary angle greater than zero (0) degree; in other words, the hole 20A is tilted in the insulating layer 40.

The vertical distance between each of the GOA units 31 and its corresponding clock signal wire 20 is the same. When the angle θ formed by the extension direction of each of the holes 20A and the direction Z perpendicular to the insulating layer 40 is the same, the extension length of each of the holes 20A is the same as well; that is, the length of the connecting wire 201 in each of the holes 20A is equal. Moreover, the aperture of the holes 20A is equal and the resistant value of each of the connecting wires 201 is equal. Therefore, the transmission difference in the clock signal between the plurality of GOA units 31 and their corresponding clock signal wires 20 is effectively reduced in the embodiment of the present disclosure, further increasing the uniformity of the clock signal transmitted to each of the GOA units 31.

Furthermore, the extension direction of the plurality of holes 20A may be the same or different. The extension length of each of the holes 20A is the same by only satisfying the requirement that the angle θ formed by the extension direction of each of the holes 20A and the direction Z perpendicular to the insulating layer 40 is equal because the vertical distance between each of the GOA units 31 and its corresponding clock signal wire 20 is the same.

Figure 4:
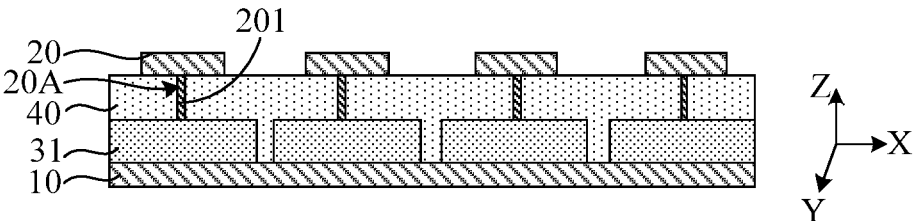
FIG. 4 is a schematic diagram of a second cross-sectional structure of the display panel as illustrated in FIG. 1.

Please refer to FIG. 1 and FIG. 4. FIG. 4 is a schematic diagram of a second cross-sectional structure of the display panel 100 as illustrated in FIG. 1. The difference between the cross-sectional structure of the display panel 100 as illustrated in FIG. 3 and the cross-sectional structure of the display panel 100 as illustrated in FIG. 4 is that, each of the holes 20A extends in a direction perpendicular to the insulating layer 40 in the embodiment of the present disclosure.

The angle θ formed by the extension direction of each of the holes 20A and the direction Z perpendicular to the insulating layer 40 is zero degree. At this time, the pitch between each of the GOA units 31 and its corresponding clock signal wire 20 is the shortest, which effectively reduces the loss of the clock signal during transmission and increases the accuracy of the clock signal transmitted to each of the GOA units 31.

Preferably, the plurality of the clock signal wires include a first clock signal wire and a second clock signal wire. The positive projection of the first clock signal wire on the substrate is arranged in the positive projection of the GOA unit 31 on the substrate 10. The positive projection of the second clock signal wire on the substrate 10 is interlaced with the positive projection of the GOA unit 31 on the substrate 10.

Figure 5:
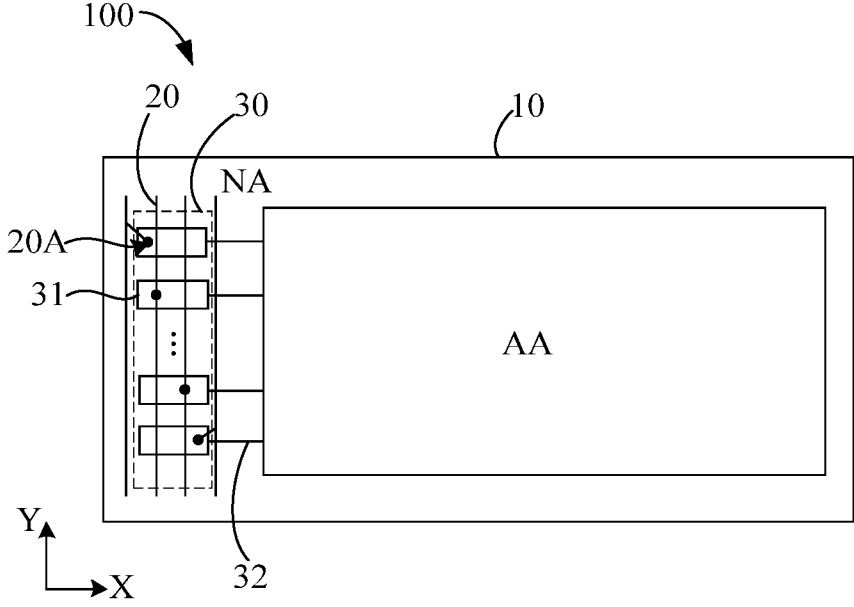
FIG. 5 illustrating a schematic diagram of a second planar structure of the display panel according to the present disclosure.

Please refer to FIG. 5 illustrating a schematic diagram of a second planar structure of the display panel 100 according to the present disclosure. Compared with the display panel 100 as illustrated in FIG. 1, the plurality of clock signal wires 20 include a first clock signal wire 21 and a second clock signal wire 22 in FIG. 5. The first clock signal wire 21 intersects the plurality of GOA units 31 on different layers. The positive projection of the second clock signal wire 22 on the substrate 10 is intertwined with the positive projection of the GOA circuit 30 on the substrate 10.

The second clock signal wire 22 in a plurality of clock signal wires 20 is interlaced with the GOA circuit 30 in the embodiment of the present disclosure, which may increase the spacing among each of the clock signal wires 20. It not only avoids signal crosstalk between adjacent clock signal wires 20 but also short circuit or disconnection produced when the hole is formed if the distance between the adjacent clock signal wires 20 is small.

In addition, the number of clock signal wires 20 increases correspondingly if the GOA circuit 30 needs a larger number of the clock signals. The second clock signal wire 22 is interlaced with the GOA circuit 30, which may lower the difficulty in wiring.

Figure 6:
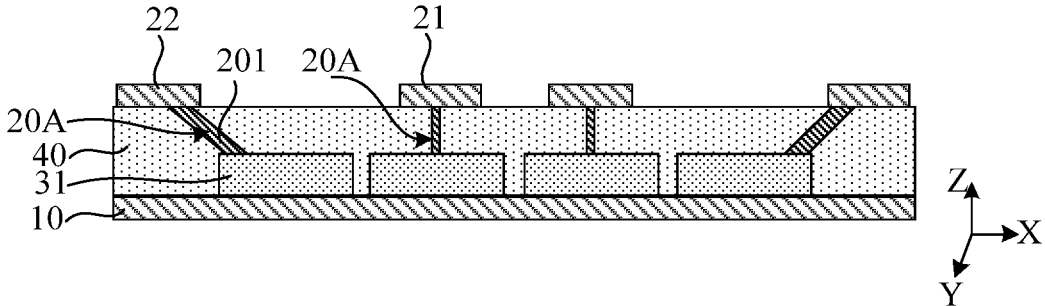
FIG. 6 is a schematic diagram of a first cross-sectional structure of the display panel 100 as illustrated in FIG. 5.

Further, please refer to FIG. 5 and FIG. 6. FIG. 6 is a schematic diagram of a first cross-sectional structure of the display panel 100 as illustrated in FIG. 5. The display panel 100 further includes an insulating layer 40. The insulating layer 40 is disposed between the clock signal wire 20 and the GOA circuit 30. The hole 20A is disposed in the insulating layer 40.

The hole 20A corresponding to the first clock signal wire 21 extends in the direction Z perpendicular to the insulating layer 40. The aperture 20A corresponding to the second clock signal wire 22 is greater than the aperture 20A corresponding to the first clock signal wire 21.

The first clock signal wire 21 intersects the plurality of GOA units 31 on different layers so the hole 20A connecting the first clock signal wire 21 and the GOA unit 31 may extend in the direction Z which is perpendicular to the insulating layer 40. Because the positive projection of the second clock signal wire 22 on the substrate 10 and the GOA circuit 30 is intertwined on the substrate 10, the extension length of the hole 20A between the first clock signal wire 21 and the GOA unit 31 is greater than the extension length of the hole 20A connected to the first clock signal wire 21 and the GOA unit 31. In other words, the pitch of the connecting wire 201 between the second clock signal wire 22 and the GOA unit 31 is longer. Therefore, the aperture of the hole 20A corresponding to the second clock signal wire 22 is greater than the aperture of the hole 20A corresponding to the first clock signal wire 21 in the embodiment of the present disclosure, which may reduce the clock signal transmission difference caused by the pitch difference and further may increase the uniformity of the clock signal transmitted to each of the GOA units 31.

Figure 7:
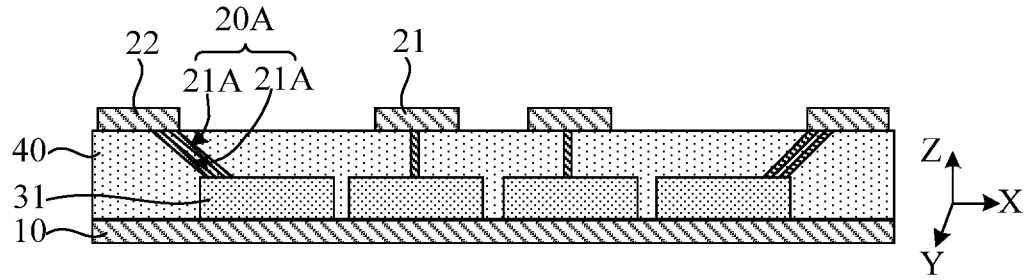
FIG. 7 is a schematic diagram of a second cross-sectional structure of the display panel 100 as illustrated in FIG. 5.

Please refer to FIG. 5 and FIG. 7. FIG. 7 is a schematic diagram of a second cross-sectional structure of the display panel 100 as illustrated in FIG. 5. The difference between the cross-sectional structure of the display panel 100 as illustrated in FIG. 6 and the cross-sectional structure of the display panel 100 as illustrated in FIG. 7 is that, each of the holes 20A corresponding to the second clock signal wire 22 includes a plurality of sub-holes 21A in the embodiment of the present disclosure. The second clock signal wire 22 is connected to its corresponding GOA unit 31 through the plurality of sub-holes 21A.

When the hole 20A corresponding to the first clock signal wire 21 extends in the direction Z which is perpendicular to the insulating layer 40, the pitch between the second clock signal wire 22 and the GOA unit 31 is greater than the pitch between the first clock signal wire 21 and the GOA unit 31. Therefore, each of the holes 20A corresponding to the second clock signal wire 22 includes the plurality of sub-holes 21A in the present disclosure. Owing to parallel connection of the plurality of sub-holes 21A, the transmission loss caused by the longer pitch between the second clock signal wire 22 and the GOA unit 31 may be reduced, which may further lessen the transmission loss difference due to the pitch difference between the first clock signal wire 21 and the GOA unit 31 and between the second clock signal wire 22 and the GOA unit 31.

The aperture of each of the holes 20A corresponding to the first clock signal wire 21 is the same as the aperture of the sub-hole 21A, thereby reducing the difficulty of the process and simplifying the process.

Figure 8:
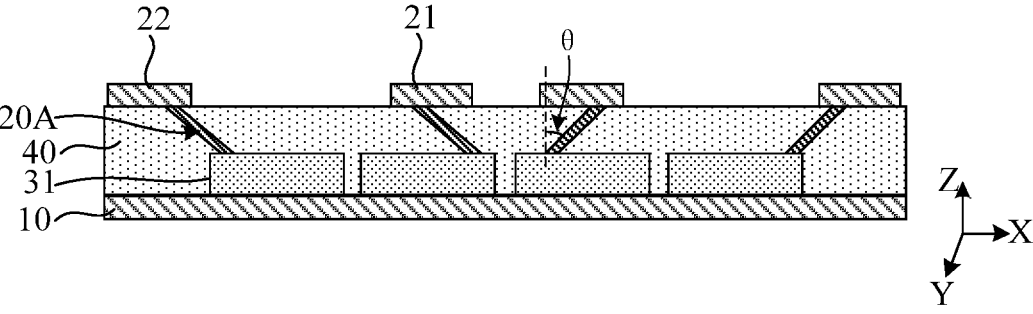
FIG. 8 is a schematic diagram of a third cross-sectional structure of the display panel 100 as illustrated in FIG. 5.

Please refer to FIG. 5 and FIG. 8. FIG. 8 is a schematic diagram of a third cross-sectional structure of the display panel 100 as illustrated in FIG. 5. The difference between the cross-sectional structure of the display panel 100 as illustrated in FIG. 6 and the cross-sectional structure of the display panel 100 as illustrated in FIG. 8 is that, an angle θ is formed by an extension direction of the hole 20A corresponding to the first clock signal wire 21 and the direction Z perpendicular to the insulating layer 40 in the embodiment of the present disclosure.

When the hole 20A corresponding to the first clock signal wire 21 extends in the direction Z (i.e., a thickness direction of the insulating layer 40), the pitch between the second clock signal wire 22 and the GOA unit 31 is greater than the pitch between the first clock signal wire 21 and the GOA unit 31. Therefore, the angle θ is formed by an extension direction of the hole 20A corresponding to the first clock signal wire 21 and the direction Z perpendicular to a plane direction of the insulating layer 40 in the embodiment of the present disclosure to increase the pitch between the first clock signal wire 21 and the GOA unit 31 and further to decrease pitch difference between the first clock signal wire 21 and the GOA unit 31 and between the second clock signal wire 22 and the GOA unit 31.

In addition, the angle θ is greater than zero degree. For example, the angle θ may be 5 degrees, 10 degrees, 30 degrees, 50 degrees, and so on. Specifically, the angle θ may be designed according to the pitch difference between the first clock signal wire 21 and the GOA unit 31 and between the second clock signal wire 22 and the GOA unit 31.

Figure 9:
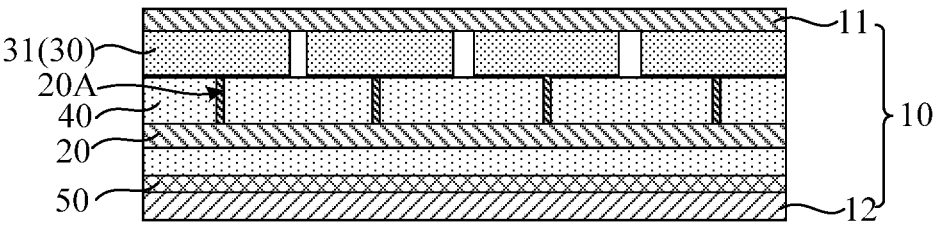
FIG. 9 is a schematic cross-sectional structure of the non-display area of the display panel according to the present disclosure.

FIG. 9 is a schematic cross-sectional structure of the non-display area NA of the display panel according to the present disclosure. The display panel 100 is a liquid crystal display (LCD) panel in the present disclosure. The substrate 10 includes a first substrate 11 and a second substrate 12. The first substrate 11 may be an array substrate. The second substrate 12 may be a color film substrate. The GOA circuit 30 is disposed on the first substrate 11. The GOA circuit 30 and an array layer (disposed in the display area AA, not shown) on the first substrate 11 are arranged in the same layer. The clock signal wire 20 is disposed on the second substrate 12. The display panel 100 further includes a common electrode layer 50. The common electrode layer 50 is disposed on the second substrate 12 and is disposed on one side of the clock signal wire 20 adjacent the second substrate 12.

The positional relationship between the clock signal wire 20 and the GOA circuit 30 is not confined to the above-mentioned embodiment, and the clock signal wire 20 and the GOA circuit 30 are both arranged on the first substrate 11. Specifically, the clock signal wire 20 may be disposed on one side of the GOA circuit 30 adjacent the first substrate 11. The clock signal wire 20 may be disposed on one side of the GOA circuit 30 away from the first substrate 11 as well. When the clock signal wire 20 is disposed on one side of the first substrate 11 and is arranged on the side of the GOA circuit 30 adjacent to the first substrate 11 and away from the common electrode layer 50, the coupling capacitance between the clock signal wire 20 and the common electrode layer 50 may be reduced.

Correspondingly, the present disclosure further proposes a display device. The display device includes a display panel and a timing controller 200. The display panel is the display panel introduced in any one of the embodiments of the present disclosure so far. Specifically, a user of the present disclosure can refer to the embodiments of the present disclosure so far, and the detail is not provided here. The timing controller 200 is electrically connected to the GOA circuit in the display panel to output the controlling signal to the GOA circuit.

The display device may be a smartphone, a tablet computer, a video player, a personal computer, and so on in the present disclosure, which is confined by the present disclosure.

Figure 10:
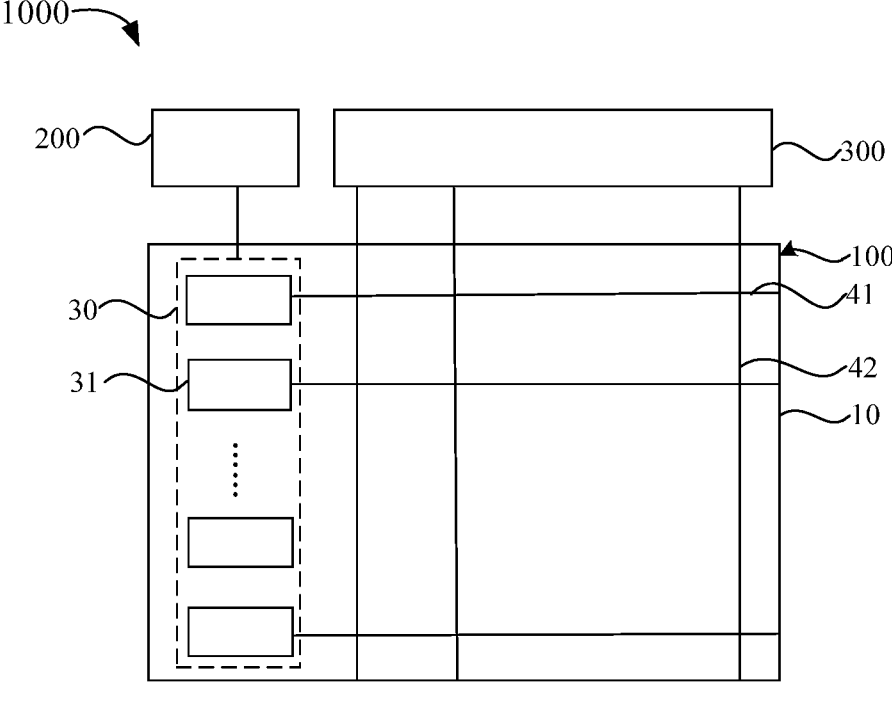
FIG. 10 is a schematic diagram of a display device according to the embodiment of the present disclosure.

Please refer to FIG. 10. FIG. 10 is a schematic diagram of a display device 1000 according to the embodiment of the present disclosure. The display device 1000 includes the display panel 100 and a timing controller 200. The display panel 100 includes the GOA circuit 30. The timing controller 200 is configured to provide a controlling signal to the GOA circuit 30.

The display panel 100 includes a substrate 10, a plurality of scanning wires 41 disposed on the substrate 10, and a plurality of data wires 42 disposed on the substrate 10. The plurality of scanning wires 41 are arranged in the first direction X. The plurality of data wires 42 are arranged in the second direction Y. Each of the GOA units 31 is connected to one or more scanning wires 41. The display panel 100 further includes a plurality of subpixels (not shown). Each of the plurality of subpixels is electrically connected to its corresponding scanning wire 41 and the data wire 42. The display panel 100 may further include a source driver chip 300. The source driver chip 300 is connected to the data wire 42 to output a data voltage to the subpixel through the data wire 42.

The timing controller 200 can generate a controlling signal configured to control the GOA circuit 30 in response to the controlling signal received from the outside. For example, the controlling signal may include a clock signal, a vertical synchronous signal, and a horizontal synchronous signal. The GOA circuit 30 outputs a plurality of cascaded scanning signals to its corresponding scanning wire 41 under the action of the controlling signal.

In the display device of the present disclosure, the GOA circuit 30 and the clock signal wire 20 are arranged on different layers, the positive projection of the plurality of clock signal wires 20 on the substrate 10 overlaps one or more of the positive projection of the GOA circuit 30 on the substrate 10 partially. It may effectively reduce the pitch difference between the plurality of GOA units 31 and their corresponding clock signal wires 20, thereby increasing the uniformity of the clock signal transmitted to each GOA unit 31. Additionally, the bezel of the display panel 100 can be further reduced, and the quality of the display device 1000 can be further improved because the positive projection of the plurality of clock signal wires 20 on the substrate 10 overlaps one or more of the positive projection of the GOA circuit 30 on the substrate 10.

The present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

What is claimed is:

1. A display panel, comprising:
   a substrate;
   a plurality of clock signal wires, comprising one or more first clock signal wires and one or more second clock signal wires, disposed on the substrate and arranged in a first direction;
   a gate driver on array (GOA) circuit, comprising a plurality of cascaded GOA units arranged in a second direction perpendicular to the first direction, wherein the GOA circuit and the clock signal wires are arranged on different layers, and the GOA units are correspondingly connected to the clock signal wires via one or more holes;
   wherein the display panel further comprises an insulating layer disposed between the clock signal wires and the GOA circuit, and the holes are disposed in the insulating layer, wherein in a plane perpendicular to a plane in which the substrate lies, an extension direction of the hole corresponding to each first clock signal wire and an extension direction of the hole corresponding to each second clock signal wire are not parallel;
   wherein a positive projection of the plurality of clock signal wires on the substrate overlaps a positive projection of the GOA circuit on the substrate;
   wherein the first clock signal wire intersects the plurality of GOA units on different layers; a positive projection of the second clock signal wire on the substrate is interlaced with the positive projection of the GOA unit on the substrate; and
   wherein the extension direction of the hole which the first clock signal wire corresponds to is parallel to a thickness direction of the insulating layer, and an aperture of the hole which the second clock signal wire corresponds to is greater than an aperture of the hole which the first clock signal wire corresponds to.

2. The display panel according to claim 1, wherein a vertical distance between each of the GOA units and its corresponding clock signal wire is equal.

3. The display panel according to claim 1, wherein an angle formed by the extension direction of the hole corresponding to the first clock signal wire and the thickness direction of the insulating layer is greater than zero degree.

4. The display panel according to claim 3, wherein each of the holes which the second clock signal wires correspond to comprises a plurality of sub-holes; each second clock signal wire is connected to the corresponding GOA unit through the plurality of sub-holes.

5. The display panel according to claim 4, wherein the aperture of each of the holes which the first clock signal wires correspond to is the same as an aperture of the sub-hole.

6. A display device comprising:
a timing controller; and
a display panel, comprising:
a substrate;
a plurality of clock signal wires, comprising one or more first clock signal wires and one or more second clock signal wires, disposed on the substrate and arranged in a first direction;
a gate driver on array (GOA) circuit, comprising a plurality of cascaded GOA units arranged in a second direction perpendicular to the first direction, wherein the GOA circuit and the clock signal wires are arranged on different layers, and the GOA units are correspondingly connected to the clock signal wires via one or more holes;
wherein the display panel further comprises an insulating layer disposed between the clock signal wires and the GOA circuit, the holes are disposed in the insulating layer, and an extension direction of the hole which each first clock signal wire corresponds to is parallel to a thickness direction of the insulating layer, wherein in a plane perpendicular to a plane in which the substrate lies, the extension direction of the hole corresponding to each first clock signal wire and an extension direction of the hole corresponding to each second clock signal wire are not parallel, and wherein a pitch between the second clock signal wire and its corresponding GOA unit along the extension direction of the hole corresponding to the second clock signal wire is greater than a pitch between the first clock signal wire and its corresponding GOA unit along the extension direction of the hole corresponding to the first clock signal wire;
wherein a positive projection of the plurality of clock signal wires on the substrate overlaps a positive projection of the GOA circuit on the substrate; and
wherein each of the holes which the second clock signal wires correspond to comprises a plurality of sub-holes; each second clock signal wire is connected to the corresponding GOA unit through the plurality of sub-holes; and an aperture of each of the holes which the first clock signal wires corresponds to is the same as an aperture of the sub-hole.

7. The display device according to claim 6, wherein each of the clock signal wires intersects the plurality of GOA units; the clock signal wire is arranged on different layers; a vertical distance between each of the GOA units and its corresponding clock signal wire is equal.

8. The display device according to claim 6, wherein the first clock signal wire intersects the plurality of GOA units on different layers; a positive projection of the second clock signal wire on the substrate is interlaced with the positive projection of the GOA unit on the substrate.

9. The display device according to claim 8, wherein an angle formed by the extension direction of the hole corresponding to the first clock signal wire and the thickness direction of the insulating layer is greater than zero degree.

* * * * *